United States Patent
Bornay Rico et al.

(10) Patent No.: US 8,622,705 B2
(45) Date of Patent: Jan. 7, 2014

(54) DEVICE FOR ADJUSTING THE BLADE PITCH OF A WIND GENERATOR

(75) Inventors: David Bornay Rico, Castalla (ES); Vicente Berbegal Pastor, Mallano (ES)

(73) Assignee: Sonkyo Energy, S.L., Maliano (Santander) (ES)

( * ) Notice: Subject to any disclaimer, the term of this patent is extended or adjusted under 35 U.S.C. 154(b) by 177 days.

(21) Appl. No.: 13/019,525

(22) Filed: Feb. 2, 2011

(65) Prior Publication Data

US 2011/0189016 A1    Aug. 4, 2011

Related U.S. Application Data

(63) Continuation of application No. PCT/ES2009/070381, filed on Sep. 15, 2009.

(30) Foreign Application Priority Data

Sep. 25, 2008   (ES) ................ 200801941 U

(51) Int. Cl.
*F03D 7/02*        (2006.01)
(52) U.S. Cl.
USPC .................................... 416/157 R
(58) Field of Classification Search
USPC ...... 416/147, 149, 150, 155, 156, 157 R, 158
See application file for complete search history.

(56) References Cited

U.S. PATENT DOCUMENTS

| | | | | |
|---|---|---|---|---|
| 2,554,611 A | * | 5/1951 | Biermann | 416/162 |
| 2,639,775 A | * | 5/1953 | Hunt | 416/148 |
| 2,655,604 A | * | 10/1953 | Hutter | 290/55 |
| 4,792,281 A | | 12/1988 | Coleman | |

FOREIGN PATENT DOCUMENTS

| | | |
|---|---|---|
| DE | 28 51 720 | 6/1980 |
| JP | 2002276535 | 9/2002 |

OTHER PUBLICATIONS

International Search Report issued Nov. 23, 2009 in International (PCT) Application No. PCT/ES2009/070381.

* cited by examiner

*Primary Examiner* — Nathaniel Wiehe
*Assistant Examiner* — Woody A Lee, Jr.
(74) *Attorney, Agent, or Firm* — Arent Fox LLP

(57) ABSTRACT

The device is intended to adjust the pitch of blades or propellers which are articulately coupled by means of end supports inside radial bearings which are solidly joined to a rotating head-piece of a wind generator. This adjustment may be performed either actively or passively. It is characterized in that the rotating head-piece incorporates a linear actuator (1), such as a cylinder, the shaft of which is connected to a crosspiece (14), the latter being associated with intermediate mechanisms connected to the end supports (7) of the blades (6) so as to vary the pitch thereof when the crosspiece (14) moves, being driven by the shaft of the cylinder.

4 Claims, 2 Drawing Sheets

DEVICE FOR ADJUSTING THE BLADE PITCH OF A WIND GENERATOR

This application is a continuation of International Patent Application No. PCT/ES2009/070381, filed Sep. 15, 2009.

OBJECT OF THE INVENTION

The present invention, as stated in the title of this specification, relates to a device for adjusting the blade pitch of a wind generator intended to modify said pitch exactly at the moment that it is needed, either actively, in response to a series of pre-set inputs, or passively, actuated by the forces that appear on the blades and the counterweights as a consequence of the rotation of the rotor array.

Therefore, the novelty of the invention is focused on a characteristic device which permits the controlled varying of the rotation around the axial direction of the blades articulately connected at their base inside radial bearings which are solidly joined to a rotating head-piece of the wind generator, the rotation and drag thereof being precisely caused by the blades connected to said head-piece and driven by the force of the wind.

BACKGROUND OF THE INVENTION

Currently, the blade pitch of a wind generator can vary mechanically by means of counterweights, so that when the blades rotate, driven by the force of the wind and due to the resulting centrifugal force, the blades can rotate around the imaginary longitudinal axis of said blades, particularly when the velocity of the wind generator starts to become dangerous due to excessively strong winds.

The blade pitch can also actively be actuated hydraulically.

DESCRIPTION OF THE INVENTION

The device for adjusting the blade pitch of a wind generator is characterised in that it is defined by a linear actuator located in a central hollow of a rotor head-piece provided with several tubular radial bearings where each blade of the wind generator is articulately connected by means of end supports where said blades are fixed.

The rotating headpiece basically comprises a tubular body inside of which the linear actuator and an annular extension wherein the tubular radial bearings are solidly joined are located.

In turn, a spring is coupled around the tubular body, as is a characteristic mobile crosspiece which incorporates a coupled ring which is guided around an end span of the tubular body, so that the linear actuator is connected to a central point of the crosspiece to move this crosspiece, either against the resistance of the spring or with it, thus varying the blade pitch and producing a rotation thereof around the axial direction thereof.

On the other hand, the linear movement of the crosspiece is transmitted to each one of the blades by means of a connecting rod which is hinged at one end in a short shaft connected to the ring of the crosspiece while the other end of the connecting rod hinges to a short arm solidly joined to the end support where the respective blade is fastened.

The blades can also include counterweights, as occurs conventionally, to passively reduce the revolutions of the rotor head-piece.

In this manner it is possible to make the adjustment system operate independently from the counterweight system, i.e., from a specific parameter, for example, the number of revolutions of the rotor head-piece array, the speed of the wind, etc.; whose duly treated parameter could automatically activate the operating means of the characteristic actuator of the invention.

Below, to provide towards a better understanding of this specification and forming an integral part thereof, figures are attached hereto, in an illustrative and non-limitative character, the object of the invention has been represented.

DESCRIPTION OF A PREFERRED EMBODIMENT

Figure 1:
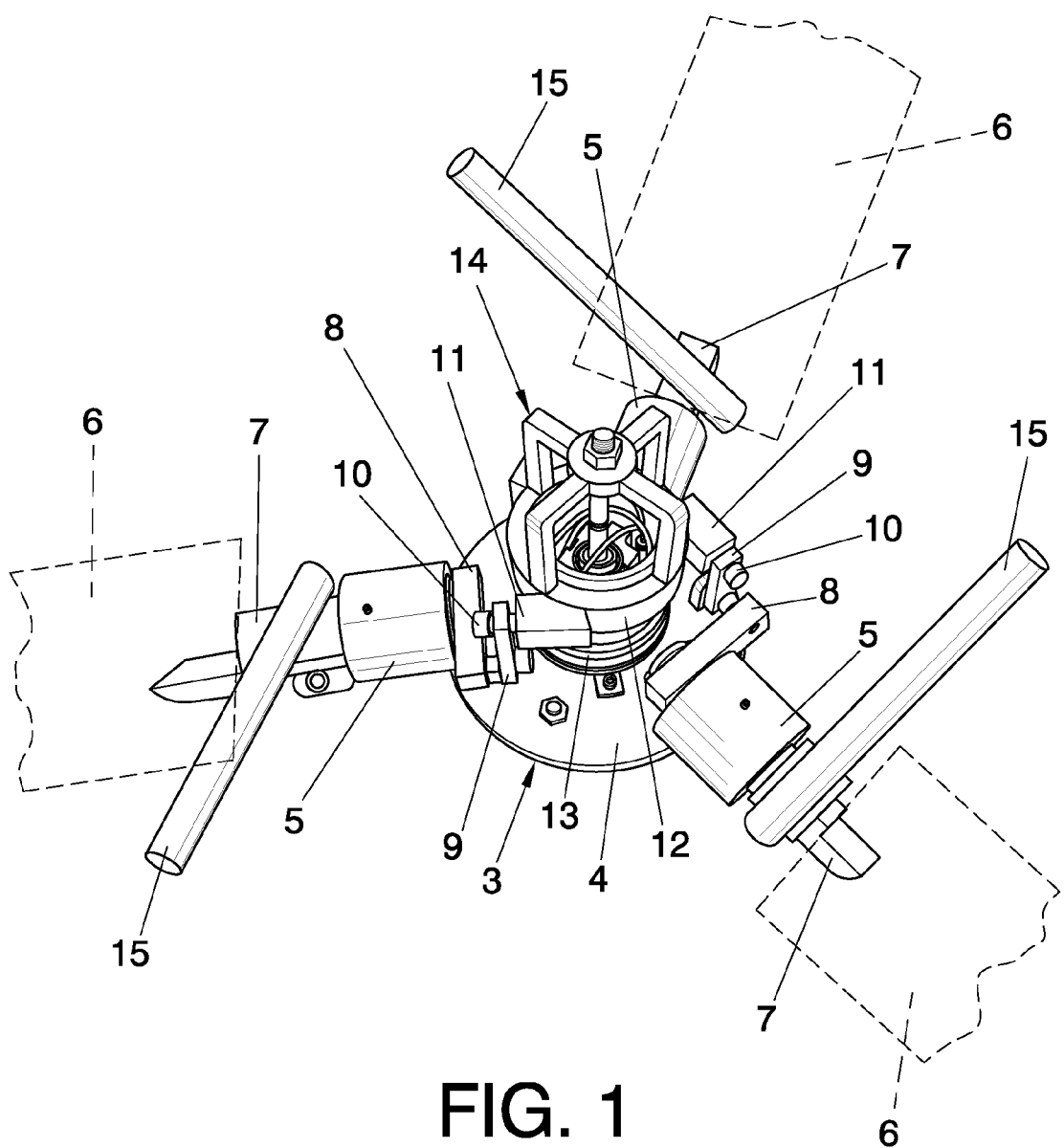
FIG. 1 Shows a perspective view of a rotor head-piece of a wind generator for adjusting the blade pitch of a wind generator, object of the invention.
Figure 2:
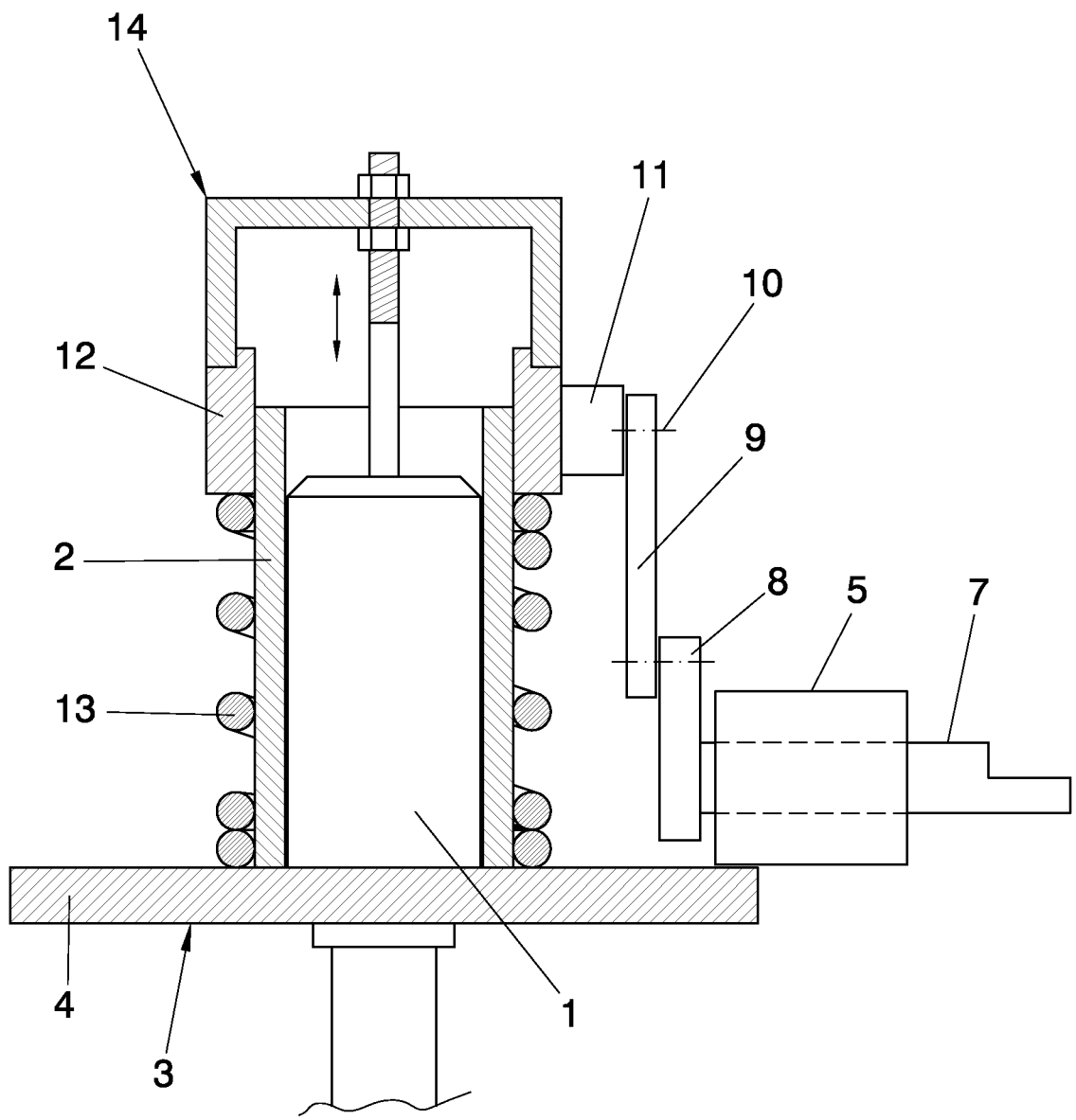
FIG. 2 Shows an elevational, sectioned view of that represented in the previous figure.

Considering the numbering used in the figures, the device for adjusting the blade pitch of a wind generator comprises a linear actuator, such as a hydraulic or pneumatic cylinder 1, located in a central hollow limited by a tubular body 2 which forms part of a rotating head-piece 3 further provided with an annular extension 4, whereto are solidly joined several radial bearings 5 where blades 6 articulately couple by means of end supports 7 whereto, in turn, arms 8 associated to connecting rods 9 are connected, linked by their free ends to short shafts 10 fastened to solid pieces 11 solidly joined to a ring 12 guided and coupled around a tubular body 2, around which is also coupled a spring 13.

The ring 12 forms part of a crosspiece 14 which projects out from the free end of the tubular body 2, while the shaft of the cylinder 1 is fastened in the centre of the crosspiece 14, so that when the shaft of the cylinder 1 moves linearly, the blade pitch 6 rotating around the imaginary longitudinal axle of said blades is modified.

The end supports 7 of the blades 7 also include counterweights 15 to be able to passively adjust the pitch of the propellers or blades 6, as occurs conventionally, during the rotation of the rotor headpiece 3 driven by the force of the wind through the blades 6.

The blade pitch 6 can be voluntarily adjusted by means of the cylinder 1, and also passively by associating the control of the activation of the cylinder 1 to the wind velocity parameter or to other parameters.

The invention claimed is:

1. A device for adjusting a blade pitch of a wind generator comprising:
   a rotating head-piece comprising a plurality of tubular radial bearings to which blades of the wind generator are articulately connected by means of end supports to which said blades are fixed; and
   a linear actuator comprising a pneumatic or hydraulic cylinder, located in a central hollow of the rotating head-piece;
   wherein the rotating head-piece comprises a tubular body inside of which the linear actuator is located, and an annular extension wherein the tubular radial bearings are solidly joined; and
   wherein the device further comprises a spring coupled around the tubular body, and a mobile crosspiece that incorporates a coupled ring guided around an end span of the tubular body and that comprises arms and connecting rods connected to the end supports of the blades, so that the linear actuator is connected to a central point of the crosspiece to move the crosspiece, either against or with the resistance of the spring, thus varying the blade pitch by means of the connecting rods and producing a rotation of the blades around an axial direction thereof.

2. The device for adjusting the blade pitch of a wind generator, according to claim 1, wherein the crosspiece is lined to each one of the end supports by means of a connecting rod which hinges at one end to an arm solidly joined to the respective end support while the opposite end of that connecting rod hinges to a short shaft fastened to a piece solidly joined to the ring.

3. The device for adjusting the blade pitch of a wind generator, according to claim 2, wherein the end supports of the blades include counterweights that can make the pitch of the blades vary during the rotation of the rotor head-piece.

4. The device for adjusting the blade pitch of a wind generator, according to claim 1, wherein the end supports of the blades include counterweights that can make the pitch of the blades vary during the rotation of the rotor head-piece.

* * * * *